(12) United States Patent
Gierer et al.

(10) Patent No.: US 7,823,710 B2
(45) Date of Patent: Nov. 2, 2010

(54) HYDRAULIC CONTROL SYSTEM FOR A HYDRODYNAMIC TORQUE CONVERTER COMPRISING A CONTROLLED TORQUE CONVERTER LOCKUP CLUTCH

(75) Inventors: Georg Gierer, Kressbronn (DE); Thilo Schmidt, Meckenbeuren (DE); Tobias Rolser, Berg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 588 days.

(21) Appl. No.: 11/911,159

(22) PCT Filed: Mar. 16, 2006

(86) PCT No.: PCT/EP2006/002422

§ 371 (c)(1),
(2), (4) Date: Oct. 10, 2007

(87) PCT Pub. No.: WO2006/108484

PCT Pub. Date: Oct. 19, 2006

(65) Prior Publication Data

US 2008/0173508 A1 Jul. 24, 2008

(30) Foreign Application Priority Data

Apr. 11, 2005 (DE) ........................ 10 2005 016 495

(51) Int. Cl.
*F16H 61/14* (2006.01)
(52) U.S. Cl. .................... 192/3.29; 192/85.63
(58) Field of Classification Search .................. None
See application file for complete search history.

(56) References Cited

U.S. PATENT DOCUMENTS 4,603,601 A * 8/1986 Nishikawa et al. ......... 192/3.31

(Continued)

FOREIGN PATENT DOCUMENTS

DE   39 37 976 A1   5/1990

(Continued)

*Primary Examiner*—Rodney H Bonck
(74) *Attorney, Agent, or Firm*—Davis & Bujold, P.L.L.C.

(57) ABSTRACT

Description of a hydraulic control system (1A) for a hydrodynamic torque converter (1) with a controlled torque converter lockup clutch (2) of an automatic transmission for controlling a supply pressure (p_WD_zu) of the torque converter (2) and a supply pressure (p_WK_zu) of the torque converter lockup clutch (2). The torque converter lockup clutch (2) is engaged when the supply pressure (p_WD_zu) of the torque converter (1) is lower than a predefined pressure level of the supply pressure (p_WK_zu) of the torque converter lockup clutch. A converter pressure valve (WDV) is provided for controlling the supply pressure (p_WD_zu) of the torque converter (1), and a converter coupling valve (WKV) for controlling the supply pressure (p_WK_zu) of the torque converter lockup clutch, where their valve slides (WDV_S, WKV_S) can be acted upon by at least one pre-control pressure (p_VS) and one system pressure (p_sys). When the torque converter lockup clutch (2) is disengaged, the valve slide (WKV_S) of the converter coupling valve (WKV) is acted upon in such a way on an active surface (15) by the reverse pressure (p_WD_ab) of the torque converter (1), and when the torque converter lockup clutch (2) is engaged, is acted upon in such a way on the active surface (15) by the reverse pressure (p_WK_zu) of the torque converter lockup clutch (2), that at least either the supply pressure (p_WD_zu) of the torque converter (1) or the supply pressure (p_WK_zu) of the torque converter lockup clutch (2) is higher than a predefined pressure level (p_0) over the entire operational area of the torque converter (1).

21 Claims, 10 Drawing Sheets

U.S. PATENT DOCUMENTS

| | | | |
|---|---|---|---|
| 4,640,396 A | 2/1987 | Nishimura | |
| 4,880,090 A * | 11/1989 | Ando | 192/3.3 |
| 5,549,184 A | 8/1996 | Löffler et al. | |
| 5,934,427 A | 8/1999 | Takagi | |

FOREIGN PATENT DOCUMENTS

DE      42 03 322 A1      8/1992

* cited by examiner

HYDRAULIC CONTROL SYSTEM FOR A HYDRODYNAMIC TORQUE CONVERTER COMPRISING A CONTROLLED TORQUE CONVERTER LOCKUP CLUTCH

This application is a national stage completion of PCT/EP20061002422 filed Mar. 16, 2006, which claims priority from German Application Serial No. 10 2005 016 495.1 filed Apr. 11, 2005.

FIELD OF THE INVENTION

The invention relates to a hydraulic control system for a hydrodynamic torque converter comprising a controlled torque converter lockup clutch of an automatic transmission.

BACKGROUND OF THE INVENTION

The design of drive chains of motor vehicles with starting elements executed as hydrodynamic torque converters is sufficiently known from practice.

In most cases, dual line converters are used, each of which is equipped with an integrated torque converter lockup clutch. The torque converter lockup clutches are provided in order to reduce or, as the case may be, eliminate hydraulic losses of the hydrodynamic torque converter.

A converter clutch piston provided to actuate the torque converter lockup clutch, which is impinged upon by hydraulic pressure, is generally configured in a dual line converter as a flexible disk whose hub is connected in a torque-proof manner to a turbine of the hydrodynamic torque converter.

When the torque converter lockup clutch is disengaged, the torque converter piston is impinged upon or overflowed by an oil flow coming from an inflow-side of the hydrodynamic torque converter. In order to engage the torque converter lockup clutch, the supply pressure of the hydrodynamic torque converter is essentially reduced or switched to zero so that a static total pressure present in the hydrodynamic torque converter also essentially drops to zero. The torque converter piston, which is tensioned in the engaging direction of the torque converter lockup clutch and which is coated with a friction lining on the side facing away from the hydrodynamic torque converter, is pressed against the housing of the side of the pump of the hydrodynamic torque converter by the spring mechanism of the converter clutch piston during the last-mentioned operating state.

In order to increase the transmissibility of the torque converter lockup clutch and in that way also increase the torque that can be transmitted by the torque converter lockup clutch, the supply pressure of the torque converter lockup clutch is increased. The increase in the supply pressure of the torque converter lockup clutch increases the contact pressure of the converter clutch piston against the housing of the pump side of the hydrodynamic torque converter. In addition, when the torque converter lockup clutch is engaged, the torque converter lockup clutch piston prevents the oil flow through the hydrodynamic torque converter so that the torque converter lockup clutch essentially performs the function of a traditional hydraulic check valve.

In order to avoid the impairment of driving comfort, the torque converter lockup clutch is preferably engaged only in the operating states of the drive chain in which no stimuli resulting from rotational non-uniformity of the drive chain of a combustion engine, which are acoustically perceived by a driver inside the vehicle, are present. In contrast, however, there is an effort to engage the torque converter lockup clutch as quickly as possible in order to reduce the hydraulic power loss occurring during a startup procedure when the torque converter lockup clutch is disengaged.

Among other things, this leads to the necessity of engaging the torque converter lockup clutch, even with high rotational speed differences in the hydrodynamic torque converter, between a turbine wheel and an impeller of the torque converter, which can have such a negative effect on a engaging operation of the torque converter lockup clutch; that the torque converter lockup clutch cannot be engaged in the intended way or not engaged at all.

Among other things, this leads to the supply pressure of the hydrodynamic torque converter not dropping to zero in the intended manner, but being higher or even lower than the supply pressure of the torque converter lockup clutch, subject to the difference in rotational speed between the turbine piston and the impeller. Because the supply side of the hydrodynamic converter is separated from the torque converter by the converter clutch piston when the torque converter lockup clutch is engaged, the hydrodynamic effects occur to a considerably smaller extent compared to the supply side of the torque converter lockup clutch.

The total force components acting on the converter clutch piston are subject to the current operating state. Therefore, in an operating state of the hydrodynamic torque converter where the supply pressure of the torque converter is smaller than the supply pressure of the torque converter lockup clutch, there is the disadvantageous possibility of the torque converter lockup clutch suddenly engaging before the intended point of engagement or snapping shut, as this is called. In addition, however, there is also the possibility that the torque converter lockup clutch will not engage due to the total force components currently acting on the converter clutch piston. This latter control error of the torque converter lockup clutch is more problematic, because this control error predominantly occurs during an engagement operation of the torque converter lockup clutch at higher rotational speeds of the impeller.

An undesirable hydrodynamic effect resulting in a control error in the torque converter lockup clutch is called a pseudo-cavitation, which occurs when a temperature-dependent pressure level is exceeded in the hydrodynamic torque converter. Before this pressure level is exceeded, air dissolved in the hydraulic fluid passing through the hydrodynamic torque converter, is transformed into gas, which disadvantageously leads to air buildup in the torque converter and on the supply side of the hydrodynamic torque converter.

The abovementioned pressure level in the torque converter is then lowered by the supply pressure of the torque converter used to engage the torque converter lockup clutch being gradually lowered to zero. Then, the supply pressure of the torque converter lockup clutch for adjusting the transmissibility of the torque converter lockup clutch is increased to a designated pressure value. In that way, the static pressure in the torque converter, during the period between the point at which the supply pressure of the torque converter falls below a pressure level under which the air dissolved in the hydraulic fluid degasses and the point at which the supply pressure of the torque converter lockup clutch falls below the pressure level is decreased in such a way that air accumulates in the hydrodynamic torque converter, which forces the fluid present in the hydrodynamic torque converter out of the torque converter.

However, forcing the fluid out disadvantageously leads to a short-term pressure rise in the hydrodynamic torque converter of such nature that a total force component acts temporarily on the converter clutch piston, which causes the torque converter lockup clutch to engage, whereby essentially no torque can be transferred via the torque converter lockup clutch in this state. During subsequent operation of the torque converter, the supply pressure of the torque converter lockup clutch is successively raised in order to adjust the desired transmissibility of the torque converter lockup clutch. However, before the transmissibility of the torque converter lockup clutch rises, the air volume of the conveyed hydraulic fluid that has accumulated in the torque converter due to pseudo-cavitation must be forced out so that, despite the rise in the supply pressure of the torque converter lockup clutch, there will be a certain dead time in the control of the torque converter lockup clutch before the transmissibility of the torque converter lockup clutch rises.

At the point when the accumulated air has been completely forced out of the torque converter, due to the rise in pressure of the supply pressure of the torque converter lockup clutch, the torque converter lockup clutch suddenly has a transmissibility at which at least a torque applied to it is in part transmitted so that there is a noticeable and uncomfortable jolt for the driver of a motor vehicle due to a discontinuity in the torque transmission in the area of the torque converter lockup clutch, which results in an overall undesirable and uncomfortable ride quality of the motor vehicle.

Therefore, the task of the present invention is to provide a hydraulic control system for a hydrodynamic torque converter with a controlled torque converter lockup clutch of an automatic transmission, such that greater driving comfort can be achieved.

SUMMARY OF THE INVENTION

The hydraulic control system for a hydraulic torque converter with a controlled torque converter lockup clutch of an automatic transmission, according to the present invention, is accomplished with a converter pressure valve for controlling the supply pressure of the torque converter and with a converter coupling valve for controlling the supply pressure of the torque converter lockup clutch. The valve disks of the converter pressure valve and converter coupling valve are impinged upon by at least one pre-control pressure and one system pressure. The torque converter lockup clutch is engaged when the supply pressure of the torque converter is smaller than a predefined pressure level of the supply pressure of the torque converter lockup clutch.

By impinging the valve disk of the converter coupling valve upon an active surface by the reverse pressure of the torque converter when the torque converter lockup clutch is disengaged, and impinging the supply pressure of the torque converter lockup clutch upon the active surface when the torque converter lockup clutch is engaged, such that at least either the supply pressure of the torque converter or the supply pressure of the torque converter lockup clutch is greater than a predefined pressure level over the entire operational area of the torque converter, air accumulation in the torque converter due to pseudo-cavitation, which impairs driving comfort, is prevented in a simple way.

In the hydraulic control system, a base point between a valve characteristic curve of the converter coupling valve and a valve characteristic curve of the converter pressure valve is raised in such a way, compared to conventional control systems, that there is a higher static pressure from lifting the base point, which appears on both the supply side of the hydrodynamic torque converter and the supply side of the controlled torque converter lockup clutch, and at which degassing of the air dissolved in the hydraulic fluid carried by the torque converter over the entire operating area of the torque converter will certainly not occur.

BRIEF DESCRIPTION OF THE DRAWINGS

The invention will now be described, by way of example, with reference to the accompanying drawings, whereas in the description of the different exemplary embodiments, the components identical in construction and function carry the same reference numerals for the sake of clarity. The drawings show.

DETAILED DESCRIPTION OF THE INVENTION

Figure 1:
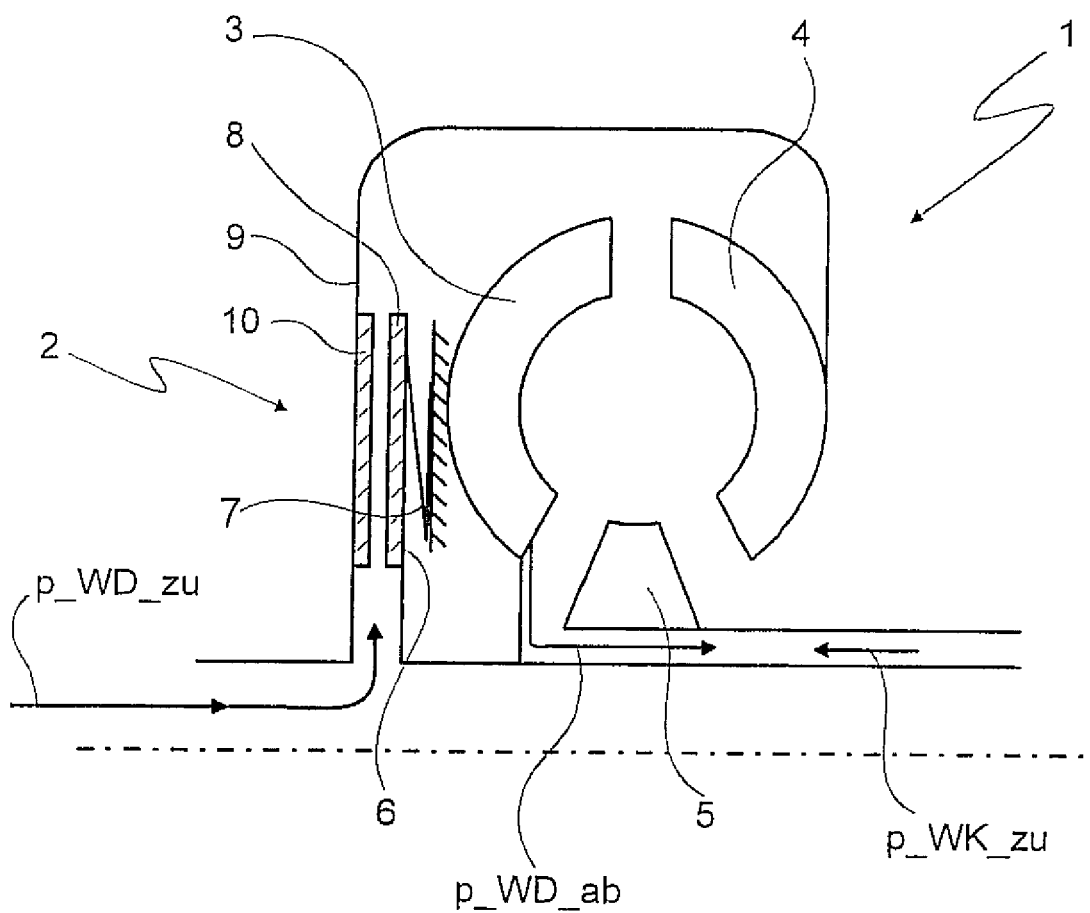
FIG. 1 is a schematic illustration of a starting element of a drive chain of a motor vehicle, which is configured as a hydrodynamic torque converter with a controlled torque converter lockup clutch.

FIG. 1 is a schematic illustration of a hydrodynamic torque converter 1 with a controlled torque converter lockup clutch 2, which is configured in a conventional manner with a turbine wheel 3, an impeller 4 and a stator 5. In addition, a converter coupling piston 6 is provided, which is connected torque-proof to the turbine wheel 3. In addition, the converter coupling piston 6 is configured in such a way in relation to the impeller 4 that it can be axially displaced; an axial position of the converter coupling piston 6, subject to a spring mechanism 7 acting on the converter coupling piston 6 and acting in the engaging direction of the torque converter lockup clutch 2, adjusting a supply pressure p_WD_zu of the torque converter and a supply pressure p_WK_zu of the torque converter lockup clutch 2, i.e., subject to a total force component resulting from these three force components and acting on the converter coupling piston 6.

When the torque converter lockup clutch 2 is engaged, a friction lining 8, arranged on the side of the coupling piston 6, facing away from the turbine wheel 3, rests against another friction lining 10 provided on a housing 9. The housing 9 is connected torque-proof to the impeller 4. In contrast, when the torque converter lockup clutch 2 is disengaged, the converter coupling piston 6 does not rest on the additional friction lining 10 of the housing 9 so that hydraulic fluid, originating from a converter pressure valve WDV shown in FIG. 2, flows through the torque converter 1, via the torque converter lockup clutch 2, in the direction of a converter coupling valve WKV, also shown in FIG. 2. The hydraulic fluid thus flows into the torque converter 1 at the supply pressure p_WD_zu of the torque converter 1 adjusted by the converter pressure valve WDV and flows out of the torque converter 1 at a reverse pressure p_WD_ab, at a correspondingly modified level subject to the hydrodynamic conditions in the torque converter 1 in the direction of the converter coupling valve WKV.

The reverse pressure p_WD_ab of the torque converter 1 corresponds to the supply pressure p_WK_zu of the torque converter lockup clutch 2 adjusted by the converter coupling valve WKV, a static pressure or, as the case may be, a pressure level subject to the operating state, being adjusted in the torque converter 1, subject to the supply pressure p_WD_zu of the torque converter 1 and the supply pressure p_WK_zu of the torque converter lockup clutch 2.

When the supply pressure p_WD_zu of the torque converter 1 decreases, the total force component acting on the converter coupling piston 6 in the opening direction of the torque converter lockup clutch 2 decreases so that the torque converter lockup clutch 2 engages at a pressure level below the supply pressure p_WD_zu of the torque converter 1 and there is no more flow through the torque converter 1 via the converter pressure valve WDV. The torque converter lockup clutch 6 thus engages at a pressure level of the supply pressure p_WD_zu of the torque converter 1 that is lower than a predefined pressure level of the supply pressure p_WK_zu of the torque converter lockup clutch. In this operating state of the torque converter 1, a total force component that engages the torque converter lockup clutch 2 acts on the converter coupling piston 6. This means that the force component consisting of the spring force of the spring mechanism 7 of the torque converter lockup clutch 2 and the supply pressure p_WK_zu of the torque converter lockup clutch 2 that acts on the converter coupling piston 6 is greater than the force component resulting from the supply pressure p_WD_zu of the torque converter 1.

Figure 2:
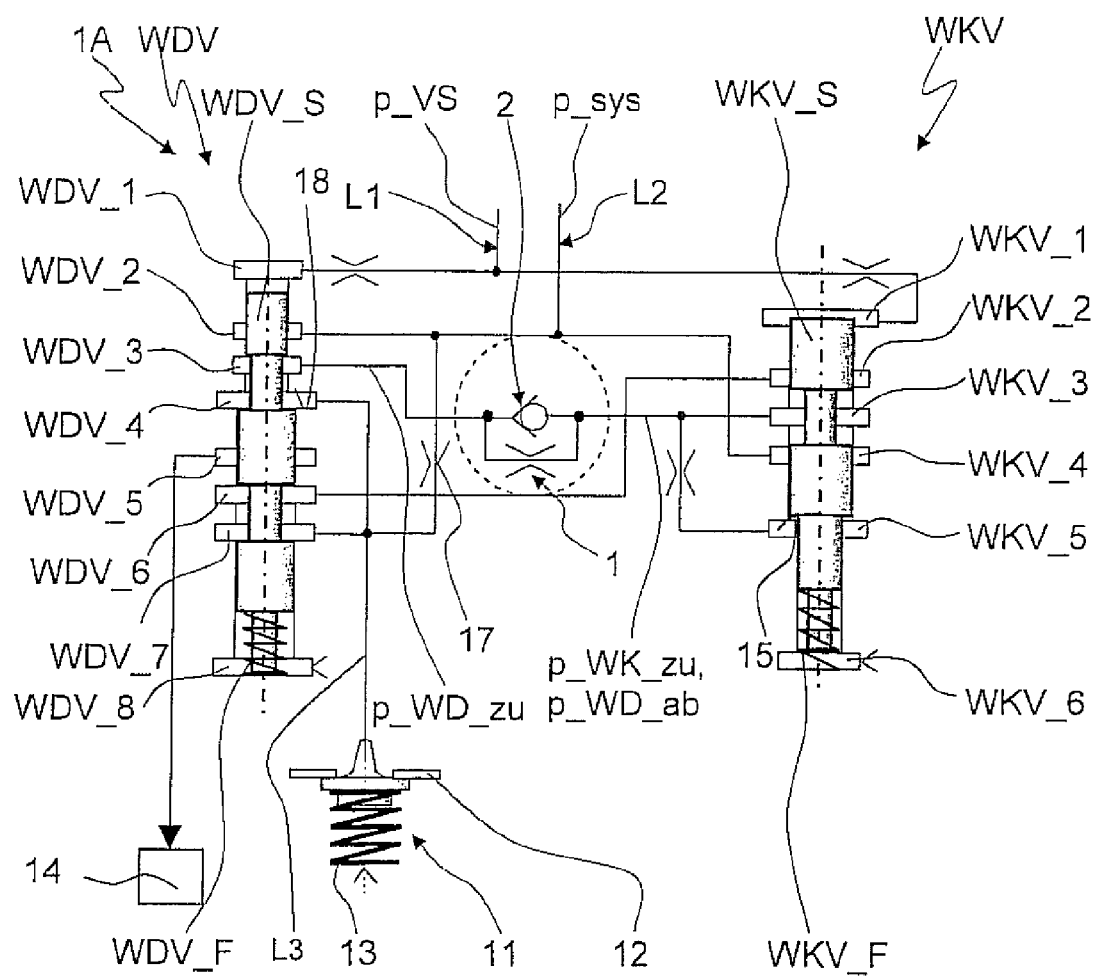
FIG. 2 is a schematic shift pattern of a first embodiment of a hydraulic control system according to the present invention.

The torque converter 1, configured as a dual line torque converter, and the controlled torque converter lockup clutch 2 are illustrated in schematic form in FIG. 2 in the form of a throttle point and a non-return valve, the hydrodynamic torque converter 1 is controlled by the converter pressure valve WDV, which is configured with a plurality of control chambers WDV_1 to WDV_8, a spring mechanism WDV_F and a valve disk WDV_S. The controlled torque converter lockup clutch 2 is controlled, via the converter coupling valve WKV, which is also configured with a plurality of control chambers WKV_1 to WKV_6, a spring mechanism WKV_F and a valve disk WKV_S.

Figure 3:
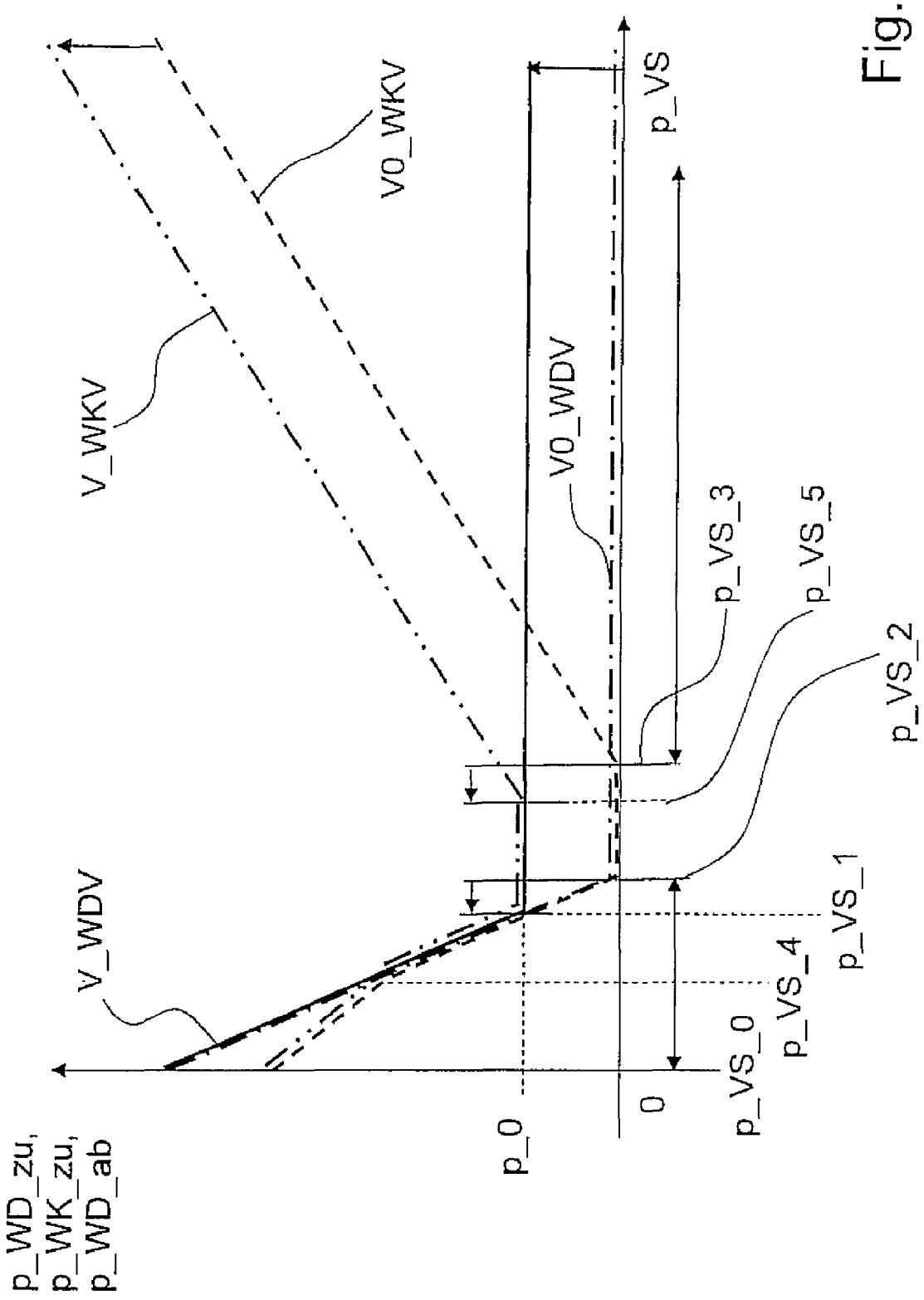
FIG. 3 is a valve characteristic curve of the converter pressure valve and a valve characteristic curve of a converter coupling valve of the control system according to FIG. 1, above a pre-control pressure compared to a valve characteristic curve of a converter pressure valve and converter coupling valve of a conventional control system.

The converter pressure valve WDV and the converter coupling valve WKV are impinged upon the front surfaces of the valve disks WDV_S and WKV_S, which are connected to the control chambers WDV_8 and WKV_8, against the spring mechanisms WDV_F and WKV_F, in a known way, via a feed line L1, from a pressure control valve of a pre-control system at a pre-control pressure p_VS, which is adjusted by an electrical transmission control system (not shown in more detail) where, depending on the precontrol pressure p_VS applied via the feed line L1 acting on the converter pressure valve WDV or, as the case may be, the converter coupling valve WKV, the supply pressure p_WD_zu of the torque converter 1 and the supply pressure p_WK_zu of the torque converter lockup clutch 2 can be adjusted respectively in the way shown in FIG. 3. In addition, the supply pressures p_WD_zu and p_WK_zu are adjusted via the converter pressure valve WDV and the converter coupling valve WK in a controlled manner by way of a system pressure p_sys, which is adjusted via a feed line L2 and a system pressure valve (not shown in detail in the Figure) and which is configured in the known way as a pressure control valve.

The system pressure p_sys supplies the seventh control chamber WDV_7 of the converter pressure valve WDV, which is connected via a feed line L3 to the fourth control chamber WKV_4 of the converter coupling valve WKV and a pressure control valve 11 via the feed line L2, which is configured with a throttle 17. In addition, the fourth control chamber WDV_4, which is a relief pressure guide of the converter pressure valve WDV, is connected to the pressure control valve 11 such that the pressure never falls below a predefined level p_0 in a control system 1A according to FIG. 2. In the present invention, the pressure control valve 11 is configured as a plate valve, which features a valve plate 12 that is tensioned against the static pressure in the hydrodynamic torque converter 1 and a spring mechanism 13.

In addition, the fifth control chamber WDV_5 is connected to a lubricating and cooling circuit 14 illustrated schematically of a transmission device of the drive chain, in order to supply the lubricating and cooling circuit 14 with the required amount of lubricant and cooling oil by correspondingly adjusting the valve disk WDV_S of the converter pressure valve WDV.

FIG. 3 shows valve characteristic curves V_WDV and V_WKV of the converter pressure valve WDV and the converter coupling valve WKV of the control system 1A, according to FIG. 2, which occur due to the arrangement of the pressure control valve 11 above the pre-control pressure p_VS. Thus, the valve characteristic curves V_WDV and V_WKV of the converter pressure valve WDV and the converter coupling valve WKV, respectively, correspond to the characteristics of the supply pressures p_WD_zu and p_WK_zu of the torque converter 1 and the torque converter lockup clutch 2. In addition, the valve characteristic curves V_WDV and V_WKV of the converter pressure valve WDV and the converter coupling valve WKV are contrasted with valve characteristic curves V0_WDV and V0_WKV of the converter pressure valve WDV and the converter coupling valves WKV, which would occur during operation of the control system 1A without the pressure control valve 11, the valve characteristic curves V_WDV and V0_WDV, as well as V_WKV and V0_WKV essentially displaying the same progression between a first pre-control pressure value p_VS_0 and a second precontrol pressure value p_VS_1.

Without the pressure control valve 11 both the supply pressure p_WD_zu of the hydrodynamic torque converter 1 and the supply pressure p_WK_zu of the controlled torque converter lockup clutch 2 in control system 1A, with the pre-control pressure p_VS rising to a third pre-control pressure level p_VS_2 sink to almost zero and remain at this level up to a fourth pre-control pressure value p_VS_3.

The area between the fourth precontrol value p_VS_3 and the third precontrol pressure value p_VS_2 of the valve characteristic curves V0_WDV, V0_WKV is termed a base point area of the torque converter 1, where the torque converter lockup clutch 2 is disengaged before the third pre-control pressure level p_VS_2, and engaged after the fourth pre-control pressure value p_VS_3. In the pre-control pressure area between the pre-control pressure values p_VS_2 and p_VS_3, the converter coupling piston 6 rests against the housing 9 due to the spring mechanism 7 being tensioned in the engaging direction of the torque converter lockup clutch 2 whereby, in this operating state of the torque converter lockup clutch 2, essentially no torque can be transmitted via the torque converter lockup clutch 2.

Only after the fourth pre-control pressure p_VS_3 and a progressively rising pre-control pressure p_VS, does the supply pressure p_WK_zu of the torque converter lockup clutch 2 rise continuously, the transmissibility of the torque converter lockup clutch 2 rising to a maximum level.

In the case of the control system 1A shown in FIG. 2, the base point area of the hydrodynamic torque converter represents a certain area of the pre-control pressure in which neither the supply pressure p_WD_zu of the hydrodynamic torque converter 1 nor the supply pressure p_WK_zu of the controlled torque converter lockup clutch 2 is changed. This means that the base point area of the torque converter 1 is essentially a neutral pressure control area, which is intended for equalization of the tolerances in the pre-control system assigned to the control system 1A.

However, with the valve characteristic curves V0_WDV and V0_WKV of the converter pressure valve WDV and the converter coupling valve WKV, the previously described air accumulation in the torque converter 1 disadvantageously occurs. For this reason, a predefined pressure level p_0 is adjusted in the control system 1A by way of the pressure control valve 11, at which level the air dissolved in the hydraulic fluid remains in dissolved form. The pressure control valve 11 in the present invention is arranged between a hydraulic fluid reservoir (not shown in more detail) and the converter pressure valve WDV, along with the converter coupling valve WKV, so that neither the supply pressure p_WD_zu of the torque converter 1 nor the supply pressure p_WK_zu of the torque converter lockup clutch 2 will never fall below the predefined pressure level p_0, and the valve characteristic curves V_WDV and V_WKV deviate from the valve characteristic curves V0_WDV and V0_WKV in the way shown in FIG. 3.

The pressure level p_0 is subject to both the active surface of the plate valve of the valve plate 12, which is impinged upon by hydraulic pressure on the control system side, and the spring force of the spring mechanism 13 of the pressure control valve 11, and may be modified, for example, by varying these two parameters subject to the current operating state of the control system 1A.

As the predefined pressure level p_0 also impinges upon the converter coupling piston 6 when the torque converter lockup clutch 2 is engaged, because of the pressure control valve 11 in the control system 1A on the supply side of the hydrodynamic torque converter 1, the transmissibility of the torque converter lockup clutch 2 is reduced at the same supply pressure p_WK_zu of the torque converter lockup clutch 2 compared to a control system in which the pressure level on the supply side of the torque converter 1 is essentially zero because the pressure difference with an engaged torque converter lockup clutch 2 between the supply side of the torque converter lockup clutch and the torque converter is reduced by the value of the predefined pressure level p_0.

In the present invention, this reduction is compensated for by a supply pressure p_WK_zu to the torque converter lockup clutch 2 that is increased by at least the predefined pressure level p_0. In addition, as the beginning of the base point area of the torque converter 1 is displaced by the rise in the pressure level in the control system 1 from the third pre-control pressure value p_VS_2 in the direction of the second pre-control pressure value p_VS_1, the compensated reduction in the transmissibility of the torque converter lockup clutch 2 by way of the pressure rise in the supply pressure p_WK_zu for the torque converter lockup clutch 2 is achieved without changing the valve reinforcement of the converter coupling WKV. This means that compensation is implemented solely through a weaker valve characteristic curve V_WKV, the resolution of the torque converter lockup clutch 2 compared to a conventional control system without a pressure control valve being unchanged. The term resolution is understood in the present invention as the dependence between the pressure change in the supply pressure p_WK_zu of the torque converter lockup clutch 2 and a flow change in the area of the pressure control valve of the pre-control system such that the pre-control pressure p_VS of the electric transmission control device is adjusted.

The mode of operation of the control system 1A, according to FIG. 2, will be described in more detail below in connection with the illustration according to FIG. 3, based on the first pre-control pressure value p_VS_0. The first pre-control pressure value p_VS_0 is at least approximately zero. In this operating state, the valve disk WDV_S of the converter pressure valve WDV is pushed by the spring mechanism WDV_F which impinges upon the valve disk WDV_S in the opposite direction of the control pressure p_VS on the valve disk WDV_S so that the supply pressure p_WD_zu of the hydrodynamic torque converter 1 is maximum. This results from the fact that the system pressure p_sys on the valve disk WDV_S of the converter pressure valve WDV, when in completely displaced position, is reduced by the converter pressure valve WDV to a maximum, which is adjusted via an active surface 18 of the valve disk WDV_S and the spring force of the spring mechanism WDV_F of the converter pressure valve WDV.

At the same time, the seventh control chamber WDV_7 is separated from the sixth control chamber WDV_6 of the converter pressure valve WDV in the position of the valve disk WDV_S that regulates pressure so that the connection between the feed line L2 and the second control chamber WKV_2 of the converter coupling valve is engaged. The pressure control in the area of the third control chamber WDV_3 of the converter pressure valve WDV takes place via the modulation of the converter pressure valve WDV between the second control chamber WDV_2 and the fourth control chamber WDV_4; the pressure of the third control chamber WDV_3 being greater than the pressure level that is predefined by the pressure control valve 11.

After flowing through the hydrodynamic torque converter 1, the backflow pressure p_WD_ab rests on the third control chamber WKV_3 and fifth control chamber WKV_5 of the torque converter valve WKV, which essentially corresponds to the supply pressure p_WK_zu of the converter lockup clutch 2; the difference between the supply pressure p_WD_zu of the torque converter 1 and the backflow pressure p_WD_ab of the torque converter 1 or, as the case may be, the supply pressure p_WK_zu of the converter lockup clutch 2 between the pre-control pressure value p_VS_0 and a further pre-control pressure value p_VS_4 being caused by pressure drop, which occurs when the hydrodynamic torque converter 1 is flowed through.

The converter coupling valve WKV is completely displaced by the application of the first pre-control pressure valve p_VS_0 by the spring mechanism WKV_F impinging on the valve disk WKV_S and the backflow pressure p_WD_ab of the hydrodynamic torque converter 1 acting in the same direction that impinges on an active surface 15 of the valve disk WKV_S of the converter coupling valve WKV so that the fourth control chamber WKV_4 is separated from the third control chamber WKV_3 of the converter coupling valve WKV, and the system pressure p_sys applied to the converter coupling valve WKV, via the feed line L2, is not transmitted in the direction of the controlled torque converter lockup clutch 2.

With rising pre-control pressure p_VS, both the valve disk WDV_S of the converter pressure valve WDV and the valve disk WKV_S of the converter coupling valve WKV are pushed against the spring force impinging on the valve disk WDV_S or WKV_S, subject to the spring constant of the spring mechanisms WDV_F or WKV_F and the reverse pressure p_WD_ab of the torque converter 1 impinging on the valve disk WKV_S of the converter coupling valve WKV, in such a way that the supply pressure p_WD_zu of the hydrodynamic torque converter 1 and thus also the reverse pressure p_WD ab of the torque converter 1 are reduced by increasing the pre-control pressure p_VS, in the way shown in FIG. 3, up to the second pre-control value p_VS_1 the valve disk WKV_S of the converter coupling valve only moving shortly before exceeding the pressure value p_0 in the direction of the modulation control edges of the control chambers WKV_2 and WKV_4.

In addition, with increasing pre-control pressure p_VS, the valve disk WKV_S of the converter coupling valve WKV, is increasingly pushed against the spring constant of the spring mechanism WKV_F in the direction of the sixth control chamber WKV_6 so that the valve disk WKV_S exceeds the control edge of the fourth control chamber WKV_4 and connects it with the third control chamber WKV_3.

At the fifth pre-control value p_VS_4, a flow through the torque converter 1 is prevented by the counter pressure of the lubricant and cooling circuit 14 so that the valve characteristic curves V_WDV and V_WKV of the converter pressure valve WDV and the converter coupling valve WKV synchronize. This means that the supply pressure p_WD_zu of the converter pressure valve WDV and the supply pressure p_WK_zu of the torque converter lockup clutch 2 are equal from the fifth pre-control pressure value p_VS_4, the supply pressure p_WK_zu of the torque converter lockup clutch 2 at this pre-control pressure value being comprised of the reverse pressure p_WD_ab and the percentage of the pressure impinging via the feed line L2 on the converter coupling valve WKV; the pressure being conducted via the converter coupling valve WKV via the fourth control chamber WKV_4 and the third control chamber WKV_3.

Between the second pre-control pressure value p_VS_1 and the sixth pre-control pressure vale p_SV_5, which define the base point area of the torque converter 1 controlled via the control system 1A with the pressure control valve 11, despite rising pre-control pressure p_VS, neither the supply pressure p_WD_zu of the torque converter 1 nor the supply pressure p_WK zu of the torque converter lockup clutch 2 is changed, whereby both supply pressure p_WD_zu and P_WK_zu remain at the predefined pressure level p_0 set by the pressure control value 11.

At the end of the base point area of the torque converter 1, i.e., above the sixth pre-control pressure value p_VS_5, a further rise in the pre-control pressure p_VS causes a rise in the supply pressure p_WK_zu of the torque converter lockup clutch 1, whereas the supply pressure p_WD_zu of the torque converter, in the position of the valve disk WDV_S of the converter pressure valve WDV, shown in FIG. 2, is not changed and remains at the predefined pressure level p_0.

This means that both the supply pressure p_WD_zu of the torque converter 1 and the supply pressure p_WK_zu of the torque converter lockup clutch 2, in contrast to a control system without a pressure control valve, lie above the predefined pressure level p_0 in all operating states of the torque converter 1. The hydrodynamic effects, known from practice, which have a negative influence on a mode of operation of a torque converter 1 and a torque converter lockup clutch 2 corresponding to it, is avoided in a simple manner.

In addition, the base point area of the hydrodynamic torque converter 1 in the control system 1A, according to FIG. 2, is displaced in the way illustrated in FIG. 3, compared to the base point area of a control system without a pressure control valve, in the direction of lower pre-control pressure values. In this way it is achieved that despite the higher supply pressure p_WD_zu of the torque converter 1 when the torque converter lockup clutch 2 is engaged, with the same pre-control pressure value p_VS at any given time, the torque converter lockup clutch 2 features the same transmissibility as in a control system without a pressure control valve. Thus, it is achieved in a simple manner that the activation of the pressure control valve of the pre-control pressure system, by way of which the pre-control pressure p_VS is adjusted by the electric transmission control device subject to electrical activation, can be carried out as in a control system without a pressure control valve.

Figure 4:
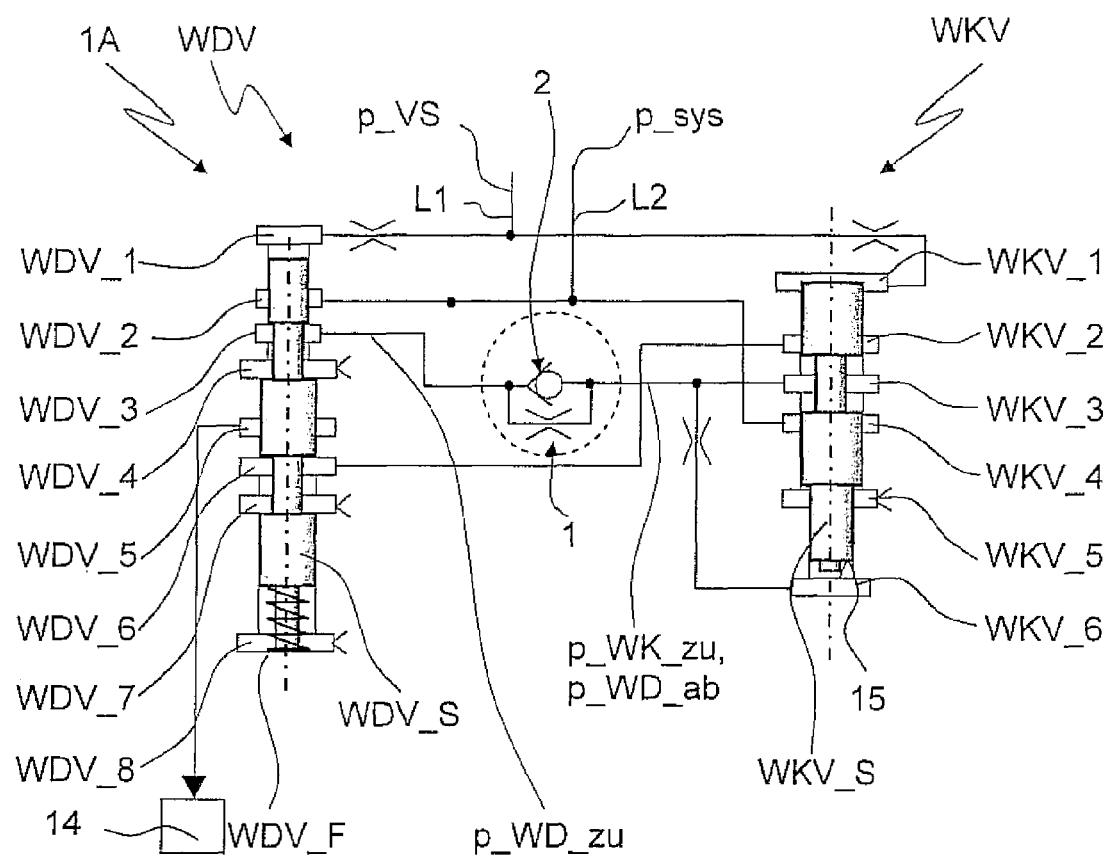
FIG. 4 is a shift pattern of a second embodiment of a control system configured according to the present invention.

The shift pattern of a second embodiment of the control system 1A, according to the present invention, shown in FIG. 4, has a similar structure to the control system 1A, according to FIG. 2, which is why the following description will only go into detail concerning the differences between the two control systems.

Figure 5:
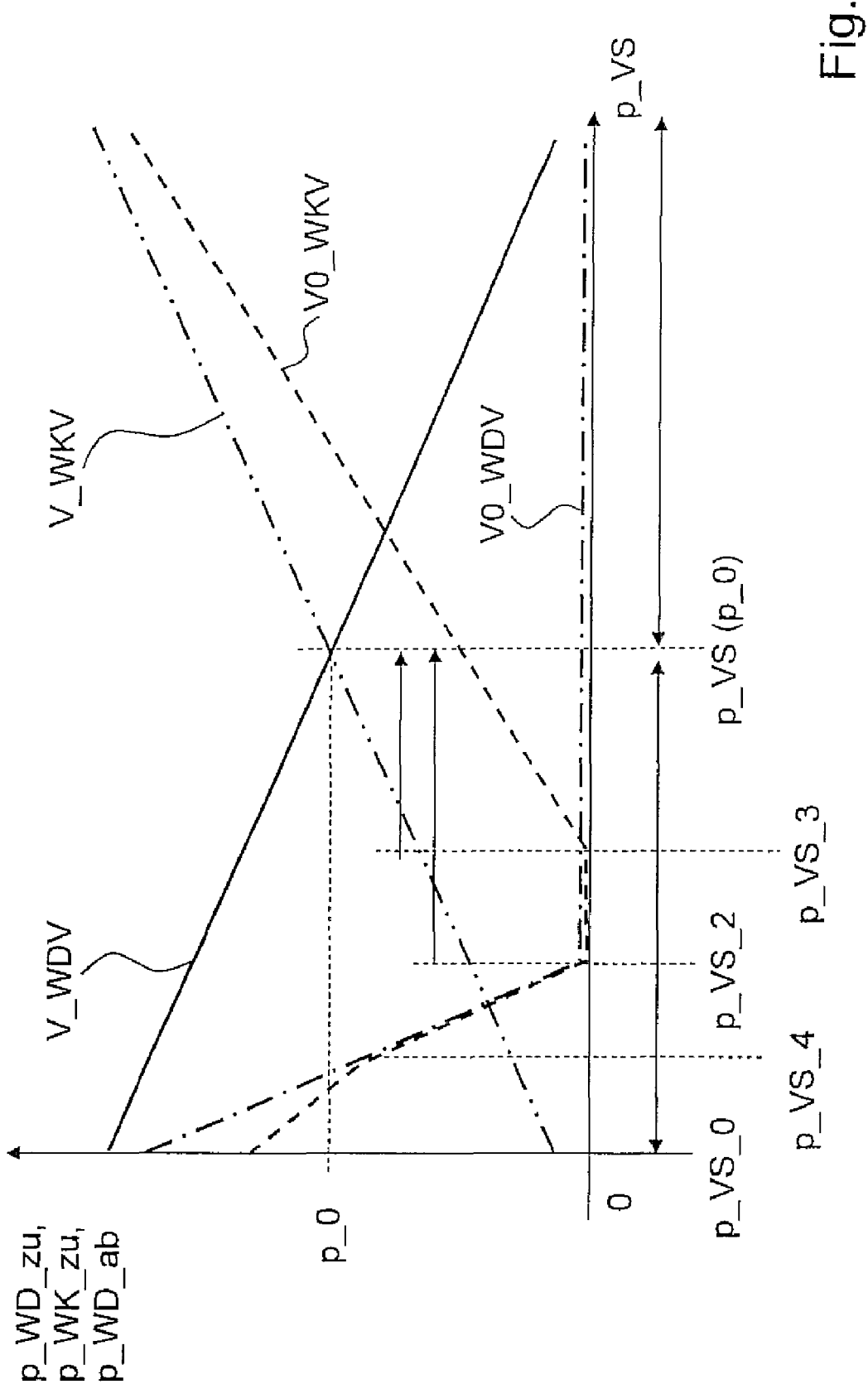
FIG. 5 is a valve characteristic curve of the converter pressure valve and the converter coupling valve of the control system, according to FIG. 4, compared to the valve characteristic curve of a conventional control system.

The control system 1A, according to FIG. 4, unlike the control system according to FIG. 2, is executed without a pressure control valve so that the fourth control chamber WDV_4 of the converter coupling valve is in direct connection to the unpressurized hydraulic fluid reservoir and the supply pressure p_WD_zu of the torque converter 1 can be lowered essentially to zero in the way shown in FIG. 5.

The torque coupling valve WKV, according to FIG. 4, unlike the converter coupling valve WKV, according to FIG. 2, is executed without the spring mechanism WKV_F, and the reverse pressure p_WD ab of the torque converter 1 or, as the case may be, the supply pressure p_WK zu of the torque converter lockup clutch 2, in the case of the converter coupling valve WKV according to FIG. 4, is carried on a larger pressure control surface or, as the case may be, active surface 15 of the valve disk WKV_S than with the converter coupling valve WKV according to FIG. 2.

The embodiment of the control system 1A, according to FIG. 2 described above, and deviating from the control system 1A, according to FIG. 4, leads to the valve characteristic curves V_WDV and V_WKV of the converter pressure valve WDV and the converter coupling valve WKV, shown in FIG. 5, which are, in turn, compared to the valve characteristic curves V0_WDV and V0_WKV shown in FIG. 3 of a conventionally executed control system.

In this case, the valve characteristic curve V_WKV of the converter coupling valve WKV, with an open torque converter lockup clutch 2, is subject to the pre-control pressure p_VS and the reverse pressure p_WD_ab of the torque converter 1, which impinges on the valve disk WKV_S of the converter valve WKV in the opposite direction in relation to the pre-control pressure p_VS. When the torque converter lockup clutch 2 is engaged, the valve characteristic curve V_WKV of the converter coupling valve WKV is subject to the pre-control pressure p_VS and the supply pressure p_WK_zu of the torque converter lockup clutch 2 that impinges in the opposite direction of the pre-control pressure p_VS on the valve disk WKV_S of the converter coupling valve WKV.

Thus, the supply pressure p_WK_zu of the torque converter lockup clutch 2 exceeds the predefined pressure level p_0 at the latest at a pre-control pressure value p_VS (p_0), at which the supply pressure p_WD_zu of the torque converter 1 falls below the predefined pressure level p_0. This ensures that the static pressure in the torque converter 1, as in the control system depicted in control system in FIG. 2, never falls below the predefined pressure level p_0 and air accumulation in the torque converter 1 is effectively avoided.

In the control system 1A shown in FIG. 4, the base point area of the torque converter 1 is reduced to the intersection point of the valve characteristic curves V_WDV and V_WKV of the converter pressure valve WDV and the converter coupling valve WKV. This means that tolerances in the pre-control system are covered to a smaller extent than in the control system 1A, according to FIG. 2, whereas the control system 1A, according to FIG. 4, is configured without a pressure control valve and, therefore, compared to the control system according to FIG. 2, is characterized by smaller manufacturing costs.

Figure 6:
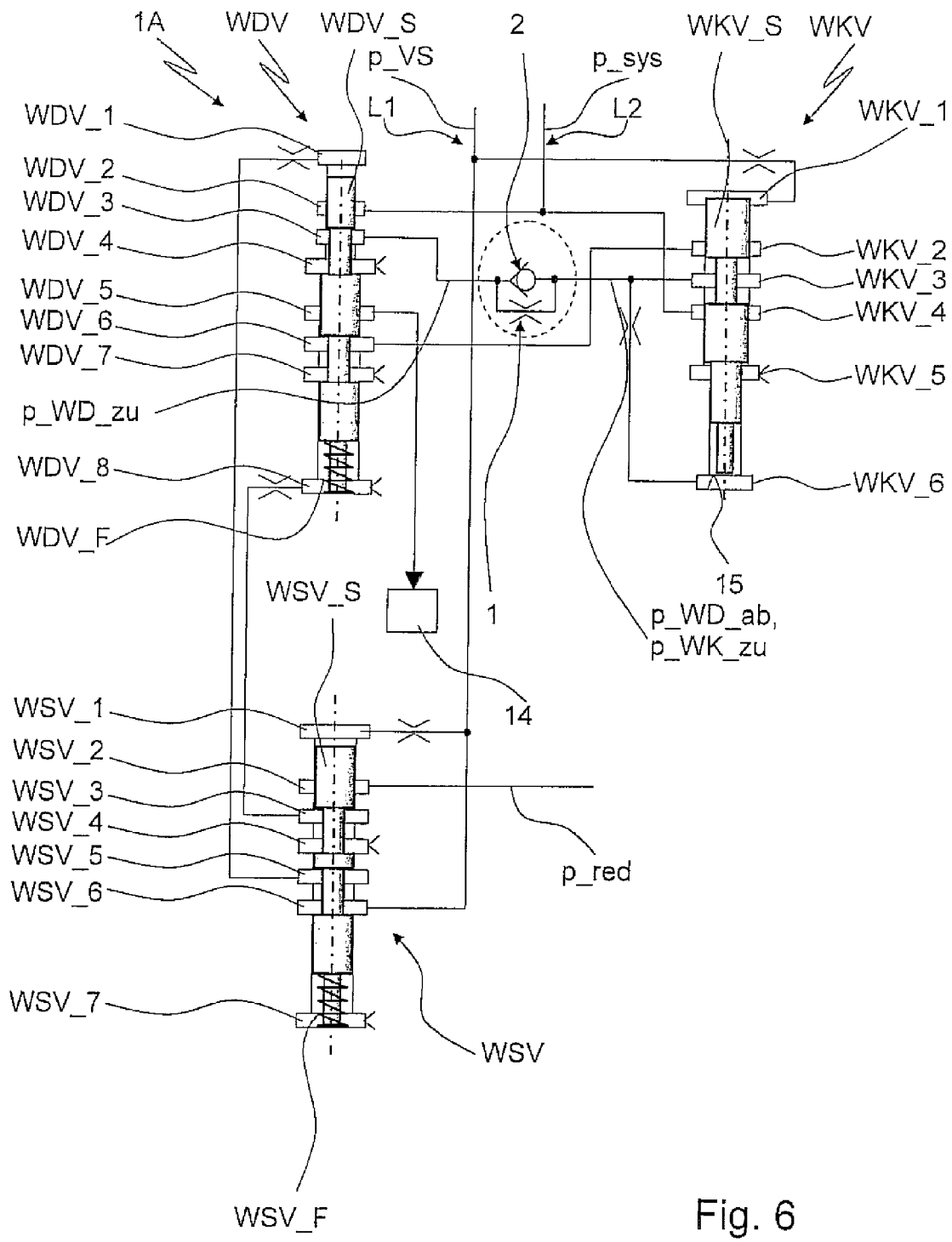
FIG. 6 is a shift pattern of a third embodiment of a hydraulic system executed according to the present invention, which is configured with a converter coupling valve.

A third embodiment of the control system 1A, according to the present invention, is presented in FIG. 6 in the form of a shift pattern, where the converter pressure valve WDV and the converter coupling valve WKV, in terms of configuration, essentially correspond to the converter pressure valve and the converter coupling valve of the control system according to FIG. 4.

In addition, the control system 1A, according to FIG. 6, is executed with a converter control valve WSV that features seven control chambers WSV_1 to WSV_7, one valve disk WSV_S and a spring mechanism WSV_F. The converter control valve WSV is impinged upon by the pre-control pressure p_VS on the front surface of the valve disk WSV_S facing away from the spring mechanism WSV_F so that the pre-control pressure p_VS works against the spring constant of the spring mechanism WSV_F and the valve disk WSV_S of the converter control valve WSV is switchable between a first switching position, shown in FIG. 6, and a second switching position in which the front surface of the valve disk WSV_S, which is impinged upon by the pre-control pressure p_VS, comes to rest against the housing of a converter control valve WSV.

In addition, a reduction pressure signal p_red is exerted on the converter control valve WSV_S which, when the valve disk WSV_S of the converter control valve WSV is in the corresponding position, is transmitted from the second control chamber WSV_2 and via the third control chamber WSV_3 in the direction of the eighth control chamber WDV_8 of the converter pressure valve WDV in which the spring mechanism WDV_F of the converter pressure valve is arranged. In addition, the pre-control pressure p_VS is also exerted on a sixth control chamber WSV_6 of the converter control valve WSV and is transmitted, when a valve disk WSV_S of the converter control valve WSV is in the corresponding position, via a fifth control chamber WSV_5, in the direction of the first control chamber WDV_1 of the converter pressure valve 1.

Figure 8:
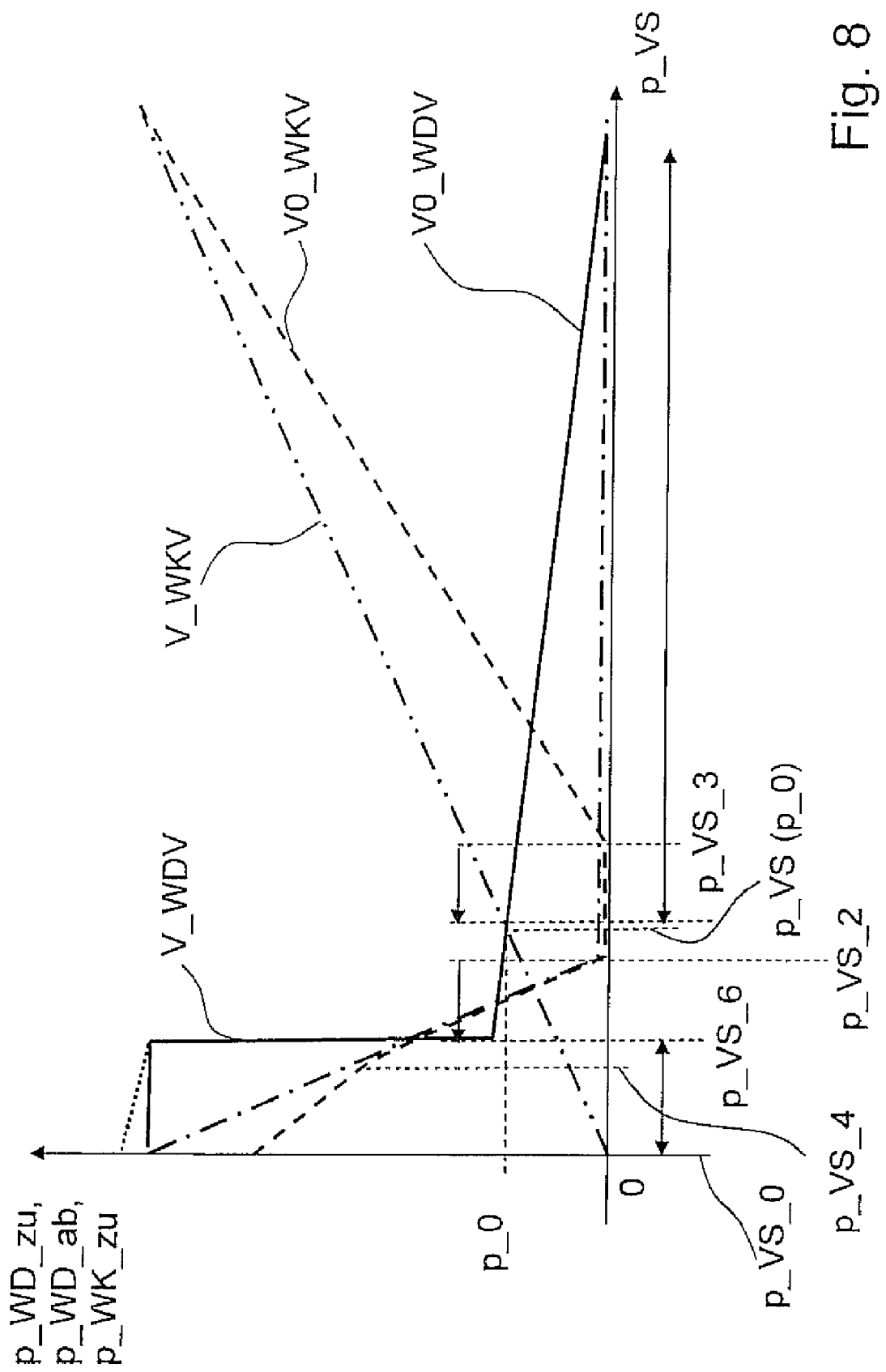
FIG. 8 is a valve characteristic curve of the converter pressure valve and converter coupling valve of the control system according to FIG. 6 and FIG. 7 compared to the valve characteristic curve of a conventional control system.

This means that according to FIG. 6, the valve characteristic curve V_WDV of the converter pressure valve WDV, shown in FIG. 8, before reaching a predefined seventh pre-control pressure value p_VS_6 of the pre-control pressure p_VS, is subject to a pressure signal that acts on the converter control valve WSV and is switched through in the direction of the converter pressure valve WDV or, as the case may be, the reduction pressure p_red and a spring mechanism WDV_F acting in the same direction, which impinges on the valve disk WDV_S of the converter pressure valve WDV, the course of the curve being essentially constant. After exceeding the predefined seventh pre-control pressure value p_VS_6 of the pre-control pressure p_VS, the valve characteristic curve V_WDV of the converter pressure valve WDV is then subject to the pre-control pressure p_VS, which is switched through via the converter control valve WSV in the direction of the first control chamber WDV_1 of the converter pressure valve WDV and the spring mechanism WDV_F, which acts in the opposite direction of the pre-control pressure p_VS on the valve disk WDV_S of the converter pressure valve WDV, because the connection between the second control chamber WSV_2 and the third control chamber WSV_3 of the converter control valve WSV is interrupted and the eighth control chamber WDV_8 of the converter pressure valve WDV is no longer impinged upon by the reduction pressure p_red or, as the case may be, the pressure signal exerted on the converter control valve WSV.

Because the converter pressure valve WDV is no longer impinged upon in the area of the eighth control chamber WDV_8 by the reduction pressure p_red once the seventh pre-control pressure value p_VS_6 is exceeded, the supply pressure p_WD_zu of the torque converter is suddenly reduced in the manner shown graphically in FIG. 8, to the pre-control pressure value p_VS_6 via the vertical area of the valve characteristic curve V_WDV for the converter pressure valve WDV. Subsequently, the supply pressure p_WD_zu of the torque converter 1 or, as the case may be, the valve characteristic curve V_WDV of the converter pressure valve WDV, shows a steady progression, with a rising pre-control pressure p_VS and is reduced to zero as the pre-control pressure p_VS increases.

The valve characteristic curve V_WKV of the converter coupling valve WKV or the progression of the supply pressure p_WK_zu of the torque converter lockup clutch 2, essentially corresponds to the constant progression shown in FIG. 5, because the converter coupling valve WKV, according to FIG. 6, essentially features the same structure as the converter coupling valve according to FIG. 4.

Figure 7:
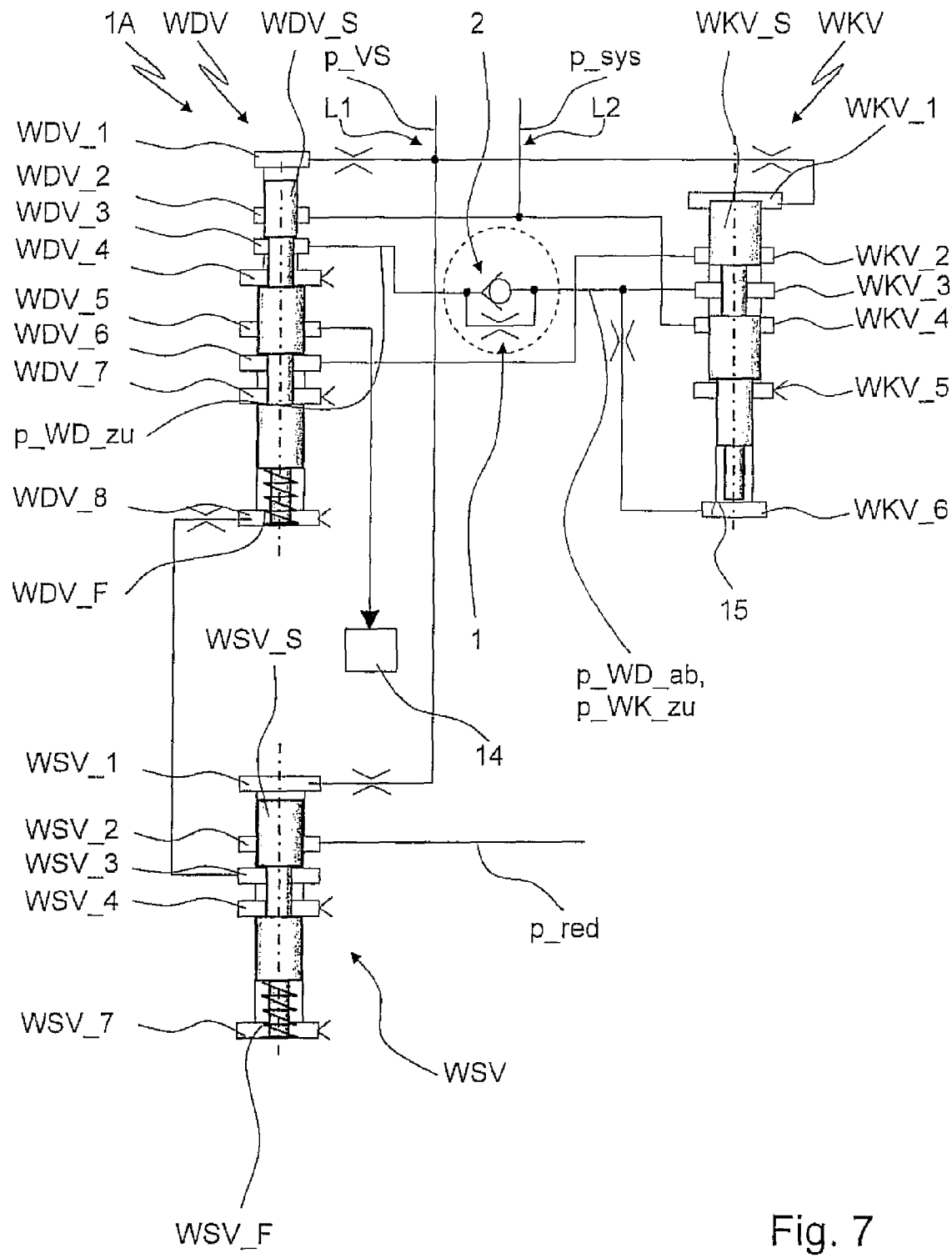
FIG. 7 is a shift pattern of a fourth embodiment of a hydraulic system executed according to the present invention, which is configured with a converter coupling valve and without a pre-control pressure coupling cutoff on the side of the converter pressure valve.

FIG. 7 shows a fourth embodiment of a control system 1A according to the present invention, which is also executed with a converter control valve WSV, like control system 1A according to FIG. 6, the converter pressure valve WDV in the area of the first control chamber WDV_1 being directly impinged upon by the pre-control pressure p_VS so that the control system 1A, according to FIG. 7, is executed without the illustrated disconnection of the pre-control pressure p_VS for the converter pressure valve WDV, shown in FIG. 6, in the area of the converter control valve WSV. The valve characteristic curves V_WDV and V_WKV of the converter pressure valve WDV and the converter coupling valve WKV of the control system 1A, according to FIG. 7, essentially correspond to the valve characteristic curves V_WDV and V_WKV of the converter pressure valve WDV and the converter coupling valve WKV of the control system, according to FIG. 6, and are graphically depicted in FIG. 8.

Before reaching the predefined seventh pre-control pressure value p_VS_6, the valve characteristic curve V_WDV of the converter pressure valve WDV, according to FIG. 7, is subject to pressure signal p_red that impinges on the converter control valve WSV and is switched through in the direction of the converter control valve WDV to a spring mechanism WDV_F that impinges in the same direction on the valve disk WDV_S of the converter pressure valve WDV and to the pre-control pressure p_VS, which in relation to the spring mechanism WDV_F acts in the opposite direction on the valve disk WDV_S of the converter pressure valve WDV, the supply pressure p_WD_zu slowly declining according to the dotted line. After exceeding the predefined seventh pre-control pressure value p_VS_6 of pre-control pressure p_VS, the valve characteristic curve V_WDV of the converter pressure valve WDV is subject to the pre-control pressure p_VS and the spring mechanism WDV_F, which acts in the opposite direction to the pre-control pressure p_VS on the valve disk WDV_S of the converter pressure valve WDV.

Throughout the entire operational area of the control system 1, the valve characteristic curve V_WKV of the converter coupling valve WKV is subject to the pre-control pressure p_VS impinging on the valve disk WKV_S and, in relation to the pre-control pressure p_VS in the opposite direction, it is subject to the reverse pressure p_WD_ab of the torque converter that impinges on the active surface 15 of the valve disk WKV_S of the converter coupling valve WKV or to the supply pressure p_WK_zu of the torque converter lockup clutch 2.

Fundamentally, the embodiments of the control system 1A, shown in FIG. 6 and FIG. 7, have in common that the valve disk WSV_S of the converter control valve WSV can be impinged upon by the pre-control pressure p_VS against the spring mechanism WSV_F and be actively connected to the converter pressure valve WDV such that the supply pressure p_WK_zu to the torque converter lockup clutch 2 exceeds the predefined pressure level p_0 at the latest at a pre-control pressure level p_VS (p_0), at which the supply pressure p_WD_zu of the torque converter 1 falls below the predefined pressure level p_0.

In order to set the transmissibility of the torque converter lockup clutch 2 at a value corresponding to a conventionally executed control system without increasing the supply pressure p_WK_zu to the torque converter lockup clutch 2, the supply pressure p_WD_zu of the torque converter 1 is continuously lowered to zero after the supply pressure p_WK_zu to the torque converter lockup clutch 2 has exceeded the predefined pressure level p_0.

Figure 9:
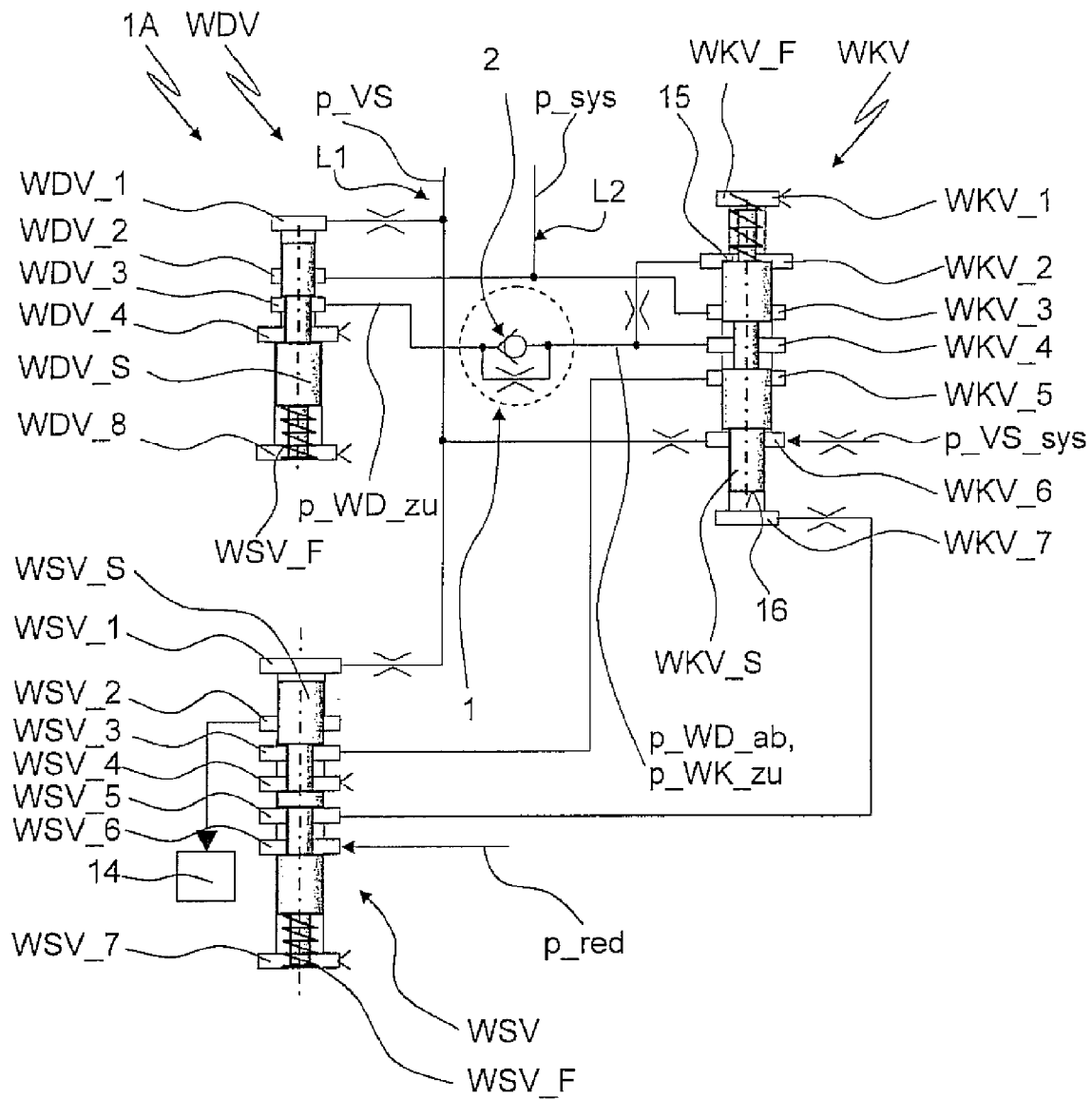
FIG. 9 is a shift pattern of a fifth embodiment of a control system according to the present invention, which is executed with a converter coupling valve in order to raise the supply pressure of the torque converter lockup clutch.

A fifth embodiment of a hydraulic control system 1A, according to the present invention, is shown in FIG. 9 in the form of a shift pattern which, as in the embodiments of the control system according to FIG. 6 and FIG. 7, is configured with the converter control valve WSV. The converter control valve WSV is constructed in the same way as the control valve WSV according to FIG. 6, a pressure signal p_red acting on the converter control valve WSV, being transmitted to a front surface 16 of the valve disk WKV_S of the converter coupling valve WSV with the corresponding shift position of the valve disk WSV_S of the converter control valve WSV.

Figure 10:
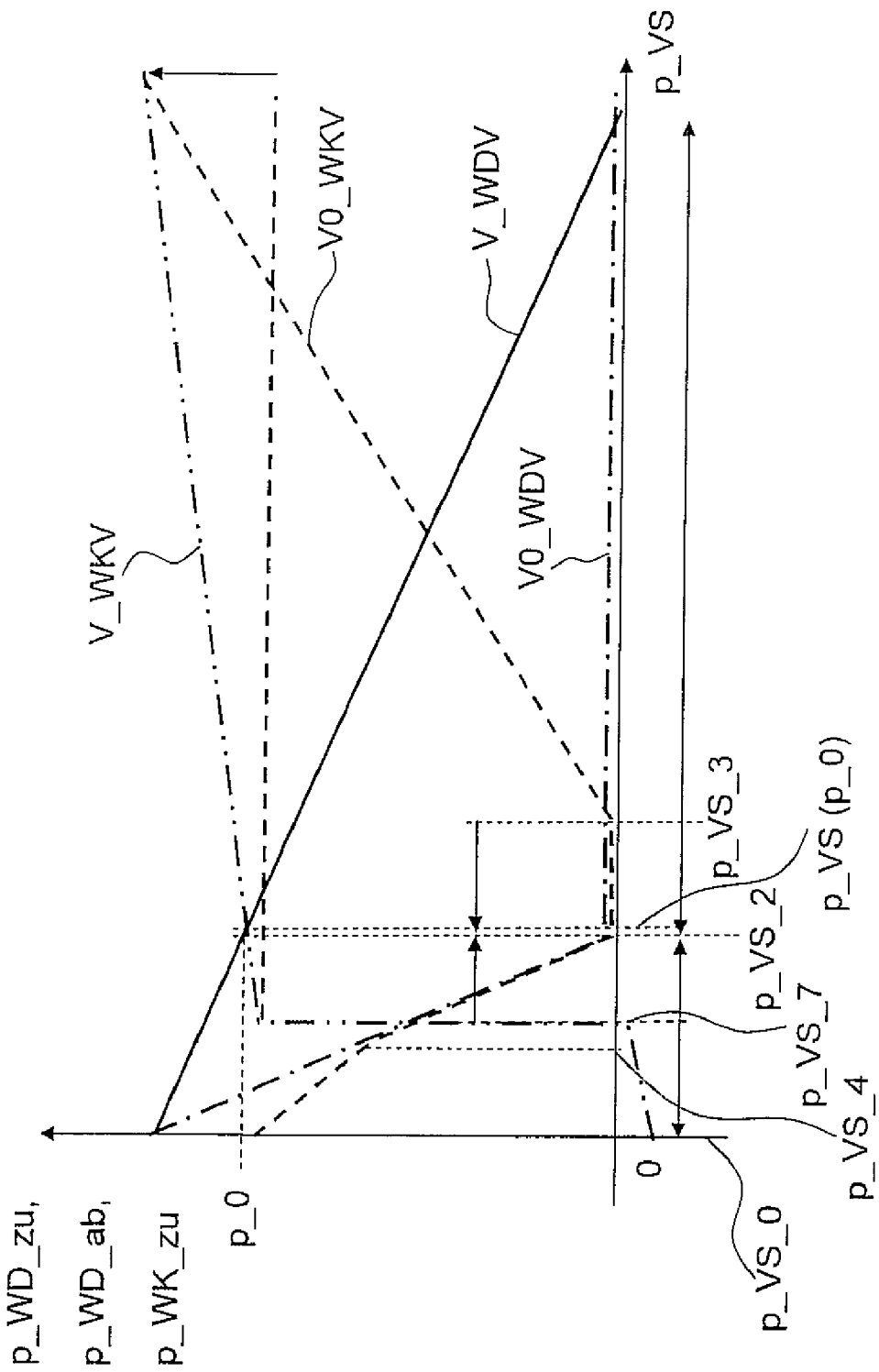
FIG. 10 is a valve characteristic curve of the converter pressure valve and the converter coupling valve of the control system, according to FIG. 9, compared to the valve characteristic curve of a conventional control system.

The valve disk WSV_S of the converter control valve WSV can be impinged upon by the pre-control pressure p_VS against the spring mechanism WSV_F and actively connected with the converter coupling valve WKV in such a way that the supply pressure p_WK_zu to the torque converter lockup clutch 2 exceeds the pressure level p_0 in the way shown in FIG. 10 at the latest at a pre-control pressure level p_VS (p_0), at which the supply pressure p_WD_zu of the torque converter 1 falls below the predefined pressure level p_0.

Before reaching a predefined eighth pre-control value p_VS_7 of the pre-control pressure p_VS, the valve characteristic curve V_WKV of the converter coupling valve WKV is subject to a spring mechanism WKV_F acting on the valve disk WKV_S of the converter coupling valve WKV and to the reverse pressure p_WD_ab of the torque converter 1, which acts in the same direction as the spring mechanism or to the supply pressure p_WK_zu of the torque converter lockup clutch 2, as well as to the pre-control pressure p_VS, which acts in the opposite direction on the valve disk WKV_S of the converter coupling valve WKV.

After the predefined eighth pre-control pressure level p_VS_7 of the pre-control pressure p_VS has been exceeded, the valve characteristic curve V_WKV of the converter coupling valve WKV is subject to the pre-control pressure p_VS to a pressure signal p_red that acts on the converter control valve WSV and is switched through in the direction of the converter coupling valve WKV, as well as impinging in relation to the pre-control pressure p_VS in the same direction on the valve disk WKV_S of the converter coupling valve WKV, to the spring constant of the spring mechanism WKV_F and to the supply pressure p_WK_zu of the torque converter lockup clutch 2, which impinges in the same way as the spring mechanism WKV_F on the valve disk WKV_S of the converter coupling valve WKV.

Throughout the entire operational area of the torque converter 1, the valve characteristic curve V_WDV of the converter pressure valve WDV is subject to the pre-control pressure p_VS acting on the valve disk WDV_S of the converter pressure valve WDV and the spring constant of the spring mechanism WDV_F, which acts against the pre-control pressure p_VS.

In the control system 1A shown in FIG. 9, unlike the embodiments of the control system according to the present invention shown in FIG. 6 and FIG. 7, the supply pressure p_WD_zu of the hydrodynamic torque converter is not suddenly reduced to a predefined pre-control value, but the supply pressure p_WK_zu of the torque converter lockup clutch 2 is suddenly increased in such a way to the predefined eighth pre-control value p_VS_7, and then, subject to the pre-control pressure signal acting on the converter coupling valve WKV on the sixth control chamber WKV_6, held constant by a rising pre-control pressure p_VS or shown as rising so that the supply pressure p_WK_zu of the torque converter lockup clutch 2 exceeds the predefined pressure level p_0 at the latest at the pre-control pressure level p_VS (p_0), at which the supply pressure p_WD_zu of the torque converter 1 falls below the predefined pressure level p_0.

With the control system 1A shown in FIG. 9, a higher base point pressure of the torque converter can be set than with the other control systems 1A, according to FIG. 2, FIG. 4, FIG. 6, and FIG. 7, absolutely ensuring that in the torque converter 1 the cavitation that impairs the functioning of the torque converter 1 and the torque converter lockup clutch 2 does not occur in the torque converter 1. In addition, the transmissibility of the torque converter lockup clutch 2 in the control system 1A, shown in FIG. 9, is set at the level of a conventionally executed control system by increasing the supply pressure p_WK_zu of the torque converter lockup clutch 2 by way of increasing pre-control pressure p_VS in the area of the converter coupling valve WKV, while the supply pressure p_WD_zu of the torque converter 1, is continuously reduced to zero in the area of the converter pressure valve WDV. The transmissibility of the torque converter lockup clutch 2 thus results from the supply pressure p_WD_zu and p_WK_zu acting on the converter coupling piston 6, as well as the spring constant of the spring mechanism 7 of the torque converter lockup clutch 2 as in the case of the previously described further embodiments of the control system 1A.

Alternative to the control of the converter coupling valve WKV by way of the pre-control pressure p_VS, there is also the possibility of controlling the converter coupling valve with a constant pre-control pressure, for example, the pre-control pressure p_VS_sys of the system pressure p_sys, where the supply pressure p_WK_zu of the torque converter

REFERENCE NUMERALS 1 hydrodynamic torque converter
1A control system
2 controlled torque converter lockup clutch
3 turbine wheel
4 impeller
5 stator
6 converter coupling piston
7 spring mechanism of the torque converter lockup clutch
8 friction lining
9 housing
10 additional friction lining
11 pressure control valve
12 valve plate
13 spring mechanism of the pressure control valve
14 lubrication and cooling circuit
15 active surface
16 front surface of the valve disk of the torque converter lockup clutch
17 throttle
18 active surface
L1, L2 feed line
L3 feed line
p_red pressure signal
p_sys system pressure
p_VS pre-control pressure
p_S_0 to:
p_S_7 pre-control pressure level
p_S (p_0) pre-control pressure level
p_VS_sys pre-control pressure
p_WD_zu supply pressure of torque converter
p_WD_ab reverse pressure of the torque converter
p_WK_zu supply pressure of the torque converter lockup clutch
V_WDV valve characteristic curve
V0_WDV valve characteristic curve
V_WKV valve characteristic curve
V0_WKV valve characteristic curve
WDV converter pressure valve
WDV_1 to:
WDV_8 control chamber
WDV_F spring mechanism
WDV_S valve disk
WKV converter coupling valve
WKV_1 to:
WKV_6 control chamber
WKV_F spring mechanism
WKV_S valve disk
WSV converter control valve
WSV_1 to:
WSV_7 control chamber
WSV_F spring mechanism
WSV_S valve disk

The invention claimed is:

1. A hydraulic control system (1A) for controlling a hydrodynamic torque converter (1) and a torque converter lockup clutch (2) of an automatic transmission, the control system comprising:
a supply pressure (p_WD_zu) of the hydrodynamic torque converter (1),
a supply pressure (p_WK_zu) of the torque converter lockup clutch (2), the torque converter lockup clutch (2) being engaged when the supply pressure (p_WD_zu) of the hydrodynamic torque converter (1) is smaller than a first predefined pressure level of the supply pressure (p_WK_zu) of the torque converter lockup clutch (2);
a torque converter pressure valve (WDV) for controlling the supply pressure (p_WD_zu) of the torque converter (1) has a valve slide (WDV_S) which is acted upon by at least a pre-control pressure (p_VS) and a system pressure (p_sys);
a torque converter clutch valve (WKV) for controlling the supply pressure (p_WK_zu) of the torque converter lockup clutch (2) has a valve slide (WKV_S) which is acted upon by at least the pre-control pressure (p_VS) and the system pressure (p_sys), the valve slide (WKV_S) of the torque converter clutch valve (WKV) has an active surface (15); and
the active surface (15) of the valve slide (WKV_S) of the torque converter clutch valve (WKV) is acted upon, when the torque converter lockup clutch (2) is disengaged, by a reverse pressure (p_WD_ab) of the torque converter (1) and when the torque converter lockup clutch (2) is engaged, by the supply pressure (p_WK_zu) of the torque converter lockup clutch (2), such that over an entire operational area of the torque converter (1), one of the supply pressure (p_WD_zu) of the torque converter (1) and the supply pressure (p_WK_zu) of the torque converter lockup clutch (2) is greater than a prime predefined pressure level (p_0).

2. The hydraulic control system according to claim 1, wherein both the supply pressure (p_WD_zu) of the hydrodynamic torque converter (1) and the supply pressure (p_WK_zu) of the torque converter lockup clutch (2) are adjustable to be higher than the prime predefined pressure level (p_0) over the entire operational area of the hydrodynamic torque converter (1) by a pressure control valve (11) that is connected to at least one of a relief control guide (WKV_2) of the converter coupling valve (WKV) and a relief control guide (WDV_4) of the converter pressure valve (WDV).

3. The hydraulic control system according to claim 1, wherein the pressure control valve (11) is as a plate valve (12) with a valve plate tensioned against a static pressure in the hydrodynamic torque converter (1).

4. The hydraulic control system according to claim 1, wherein the converter coupling valve (WKV) has a valve characteristic curve (VWKV) such that a first engaging pressure of the torque converter lockup clutch (2), at which the torque converter lockup clutch (2) is engaged, when compared to a second engaging pressure, at which, to provide full transmissibility of the torque converter lockup clutch (2) at a supply pressure (p_WD_zu) of the hydrodynamic torque converter (1), is at least approximately zero, is increased by the prime predefined pressure level (p_0) when applying the pre-control pressure (p_VS) to the converter coupling valve (WKV) at approximately a same value.

5. The hydraulic control system according to claim 1, wherein a spring mechanism (WDV_F) of the converter coupling valve (WKV) and a spring mechanism WDV_F) of the converter pressure valve (WDV) each apply a force against the pre-control pressure (p_VS) acting upon the valve slide (WKV_S) of the converter coupling valve (WKV) and the valve slide (WDV_S) of the converter pressure valve (WDV).

6. The hydraulic control system according to claim 5, wherein a valve characteristic curve (V_WDV) of the converter pressure valve (WDV) is subject to the pre-control pressure (p_VS) acting upon the valve slide (WDV_S) of the converter pressure valve (WDV) and the spring constant of the spring mechanism (WDV_F) of the converter pressure valve (WDV), as well as the prime predefined pressure level (p_0) acting on the valve slide (WDV_S) of the converter pressure valve (WDV).

7. The hydraulic control system according to claim 5, wherein when the torque converter lockup clutch (2) is disengaged, a valve characteristic curve (V_WKV) of the converter coupling valve (WKV) is subject to the pre-control pressure (p_VS) and a reverse pressure (p_WD_ab) of the hydrodynamic torque converter (1), that acts relative to the pre-control pressure (p_VS) in an opposite direction on the valve slide (WKV_S) of the converter coupling valve (WKV), as well as a force of the spring mechanism (WKV_F) of the converter coupling valve (WKV).

8. The hydraulic control system according to claim 5, wherein a valve characteristic curve (V_WKV) of the converter coupling valve (WKV), when the torque converter lockup clutch (2) is engaged, is subject to the pre-control pressure (p_VS) and the supply pressure (p_WK_zu) of the torque converter lockup clutch (2) acting in an opposite direction on the valve slide (WKV_S) of the converter coupling valve (WKV) in relation to the pre-control pressure (p_VS), as well as to a spring constant of the spring mechanism (WKV_F) of the converter coupling valve (WKV).

9. The hydraulic control system according to claim 1, wherein, a valve characteristic curve (V_WKV) of the converter coupling valve (WKV), when the torque converter lockup clutch (2) is engaged, is subject to the pre-control pressure (p_VS) and a reverse pressure (p_WD_ab) of the hydrodynamic torque converter (1), which acts in an opposite direction on the valve slide (WKV_S) of the converter coupling valve (WKV) in relation to the pre-control pressure (p_VS), and when the torque converter lockup clutch (2) is engaged, is subject to the pre-control pressure (p_VS) and the supply pressure (p_WK_zu) of the torque converter lockup clutch (2), which acts in the opposite direction to the pre-control pressure (p_VS) on the valve slide (WKV_S) of the converter coupling valve (WKV), the supply pressure (p_WK_zu) of the torque converter lockup clutch (2) exceeds the prime predefined pressure level (p_0) at a latest of a pre-control pressure value (p_VS (p_0)), at which time the supply pressure (p_WD_zu) of the torque converter (1) falls below the prime predefined pressure level (p_0).

10. The hydraulic control system according to claim 9, wherein the valve characteristic curve (V_WDV) of the converter pressure valve (WDV) is subject to the pre-control pressure (p_VS) and to a spring constant of a spring mechanism (WDV_F), which acts on the valve slide (WDV_S) of the converter pressure valve (WDV) in an opposite direction to the pre-control pressure (p_VS), such that the supply pressure (p_WK_zu) of the torque converter lockup clutch (2) exceeds the prime predefined pressure level (p_0) at a latest of the pre-control pressure level (p_vs (p_0)), at which time the supply pressure (p_WD_zu) of the hydrodynamic torque converter (1) falls below the prime predefined pressure level (p_0).

11. The hydraulic control system according to claim 1, wherein a converter control valve (WSV) is provided, and has a valve slide (WSV_S) acted upon by the pre-control pressure (p_VS) in a direction opposite to that of a spring mechanism (WSV_F), and is actively connected with the converter pressure valve (WDV), such that the supply pressure (p_WK_zu) of the torque converter lockup clutch (2) exceeds the prime predefined pressure level (p_0) at a latest of a pre-control pressure value (p_VS (p_0)) at Which time the supply pressure (p_WD_zu) of the torque converter (1) falls below the prime predefined pressure level (p_0).

12. The hydraulic control system according to claim 11, wherein before reaching a sixth predefined pressure value (p_VS_6) of the pre-control pressure (p_VS), a valve characteristic curve (V_WDV) of the converter pressure valve (WDV), is subject to a further pressure signal (p_red) that acts on the converter control valve (WSV) and is switched through in a direction of the converter pressure valve (WDV), and to a spring mechanism (WDV_F) that acts in a same direction as the further pressure signal (p_red) on the valve slide (WDV_S) of the converter pressure valve (WDV).

13. The hydraulic control system according to claim 12, wherein after exceeding the sixth predefined pressure value (p_VS_6) of the pre-control pressure (p_VS), the valve characteristic curve (V_WDV) of the converter pressure valve (WDV), is subject to the pre-control pressure (p_VS) and the spring mechanism (WDV_F), which acts in an opposite direction of the pre-control pressure (p_VS) on the valve slide (WDV_S) of the converter pressure valve (WDV).

14. The hydraulic control system according to claim 11, wherein after reaching a predefined pressure value (p_VS_6) of the pre-control pressure (p_VS), a valve characteristic curve (V_WDV) of the converter pressure valve (WDV), is subject to a further pressure signal (p_red), which acts upon the converter control valve (WDV) and is switched through in a direction of the converter pressure valve (WDV), to a spring mechanism (WDV_F) that acts in a same direction on the valve slide (WDV_S) of the converter pressure valve (WDV), and the pre-control pressure (p_VS) that, relative to the spring mechanism (WDV_F), acts in an opposite direction, on the valve slide (WDV_S) of the converter pressure valve (WDV).

15. The hydraulic control system according to claim 14, wherein after exceeding the sixth predefined pressure value (p_VS_6) of the pre-control pressure (p_VS), the valve characteristic curve (V_WDV) of the converter pressure valve (WDV), is subject to the pre-control pressure (p_VS) and the spring mechanism (WDV_F) that acts in an opposite direction of the pre-control pressure (p_VS) on the valve slide (WDV_S) of the converter pressure valve(WDV).

16. The hydraulic control system according to claim 11, wherein a valve characteristic curve (V_WKV) of the converter clutch valve (WKV) is subject to the pre-control pressure (p_VS) and the supply pressure (p_WK_zu) of the torque converter lockup clutch (2) that acts in an opposite direction of the pre-control pressure (p_VS) on the valve slide (WKV_S) of the converter clutch valve (WKV).

17. The hydraulic control system according to claim 1, wherein a converter control valve (WSV) is provided, and has a valve slide (WDV_S) that is acted upon by the pre-control pressure (p_VS) in an opposite direction of a spring mechanism (WSV_F) and is connected with the converter clutch valve (WKV) in such a way, that the supply pressure (p_WK_zu) of the torque converter lockup clutch (2) exceeds the prime predefined pressure level (p_0) at a latest of the pre-control pressure value (p_VS (p_0)), at which time the supply pressure (p_WD_zu) of the hydrodynamic torque converter (1) exceeds the prime predefined pressure level (p_0).

18. The hydraulic control system according to claim 17, wherein before reaching a ninth predefined pressure value (p_VS_9) of the pre-control pressure (p_VS), a valve characteristic curve (V_WKV) of the converter coupling valve (WKV), is subject to the spring mechanism (WKV_F) that acts on the valve slide (WKV_S) of the converter coupling valve (WKV), and a reverse pressure (p_WD_ab) of the hydrodynamic torque converter (1) that acts upon the valve slide (WKV_S) of the converter coupling valve (WKV) in the same direction as the spring mechanism (WKV_F), as well as the pre-control pressure (p_VS) that acts in the opposite direction upon the valve slide (WKV_S) of the converter coupling valve (WKV).

19. The hydraulic control system according to claim 18, wherein after exceeding a seventh predefined pressure value (p_VS_7) of the pre-control pressure (p_VS), the valve characteristic curve (V_WKV) of the converter coupling valve (WKV), is subject to the pre-control pressure (p_VS), a pressure signal (p_red) that acts upon the converter control valve (WSV) and is switched through in the direction of the converter coupling valve (WKV) as well as acting, in the same direction on the valve slide (WKV_S) of the converter coupling valve (WKV) relative to the pre-control pressure (p_VS), to the spring mechanism (WKV_F), and to the supply pressure (p_WK_zu) of the torque converter lockup clutch (2), which acts in the same direction on the valve slide (WKV_S) of the converter coupling valve (WKV).

20. The hydraulic control system according to claim 17, wherein a valve characteristic curve (V_WDV) of the converter pressure valve (WDV) is subject to the pre-control pressure (p_VS) acting upon the valve slide (WDV_S) of the converter pressure valve (WDV) and a spring constant of a spring mechanism (WDV_F) that acts against the pre-control pressure (p_VS).

21. The hydraulic control system according to claim 19, wherein the pressure signal (p_red) corresponds to one of a pre-control pressure level (p_red) above a constantly adjusted pre-control pressure value, and a pre-control pressure (p_VS_sys) of an additional pressure control valve, which is provided for controlling a system pressure valve, and thus for adjusting the system pressure (p_sys).

* * * * *